(12) United States Patent
Kraemer et al.

(10) Patent No.: US 10,545,681 B2
(45) Date of Patent: *Jan. 28, 2020

(54) ASYMMETRIC STORAGE DATA DISTRIBUTION

(71) Applicant: International Business Machines Corporation, Armonk, NY (US)

(72) Inventors: Marco Kraemer, Boeblingen (DE); Carsten Otte, Boeblingen (DE); Christoph Raisch, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/017,688

(22) Filed: Feb. 8, 2016

(65) Prior Publication Data

US 2017/0228158 A1 Aug. 10, 2017

(51) Int. Cl.
*G06F 3/06* (2006.01)

(52) U.S. Cl.
CPC .......... *G06F 3/0619* (2013.01); *G06F 3/0649* (2013.01); *G06F 3/0689* (2013.01)

(58) Field of Classification Search
CPC ....... G06F 3/064; G06F 3/0619; G06F 3/0689
See application file for complete search history.

(56) References Cited

U.S. PATENT DOCUMENTS

| 7,814,272 B2 * | 10/2010 | Barrall | G06F 3/0607 711/114 |
| 8,429,346 B1 * | 4/2013 | Chen | G06F 3/0613 709/213 |
| 8,595,411 B2 * | 11/2013 | Selinger | G06F 13/1668 711/103 |
| 8,688,906 B2 | 4/2014 | Cromer et al. | |

(Continued)

OTHER PUBLICATIONS

Balakrishnan et al., Differential RAID: Rethinking RAID for SSD Reliability. ACM Trans. Storage vol. 6, No. 2, Article 4 [retrieved from internet: Mar. 17, 2017]<URL:http://dl.acm.org/citation.cfm?id=1807061><DOI: 10.1145/1807060.1807061>.*

(Continued)

*Primary Examiner* — David Yi
*Assistant Examiner* — Nicholas A. Paperno
(74) *Attorney, Agent, or Firm* — Cantor Colburn LLP; Steven Chiu

(57) ABSTRACT

Aspects include defining a first percentage of storage areas in an array of multiple persistent storage elements as hot storage areas and a second percentage of storage areas as spare storage areas such that remaining storage areas define a third percentage as cold storage areas. Each of the storage areas are assigned to either the hot group, the spare group or the cold group, respectively. A hot and cold storage area each include a first storage block on two different storage elements, and the hot storage area and the cold storage area each include a corresponding second storage block on a storage element different to the storage element on which the first respective storage block is stored. The storage blocks (Continued)

are distributed across the storage elements such that blocks of storage areas with the highest write rate of all storage areas are placed on a hottest storage element.

20 Claims, 6 Drawing Sheets

(56) References Cited

U.S. PATENT DOCUMENTS

| | | | | |
|---|---|---|---|---|
| 9,026,863 | B2* | 5/2015 | Wu | G06F 11/3058 |
| | | | | 714/47.2 |
| 9,292,220 | B2* | 3/2016 | Gong | G06F 3/0647 |
| 9,317,367 | B2* | 4/2016 | Gao | G06F 11/108 |
| 2011/0276791 | A1* | 11/2011 | Chaudhry | G06F 9/3832 |
| | | | | 712/225 |
| 2013/0173548 | A1* | 7/2013 | Haustein | G06F 11/1448 |
| | | | | 707/638 |
| 2013/0179631 | A1 | 7/2013 | Cepulis | |
| 2014/0181437 | A1 | 6/2014 | Bruso et al. | |
| 2015/0039935 | A1 | 2/2015 | Gao et al. | |

OTHER PUBLICATIONS

Chang, One Efficient Wear Leveling for Large-Scale Flash-Memory Storage System, Proceedings of the 2007 ACM symposium on Applies computing, 2007 [retrieved from internet—Oct. 17, 2017][<URL:http://citeseerx.ist.psu.edu/viewdoc/download?doi=10.1.1.103.4903&rep=rep1&type=pdf>].*

Alistair McEwan et al., "Age Distribution Convergence Mechanisms for Flash Based File Systems," Journal of Computers, vol. 7, No. 4, 2012, 4 pages.

Mark Holland et al., "Parity Declustering for Continuous Operation in Redundant Disk Arrays," Proceedings of the 5th Conference of Architectural Support for Programing Languages and Opering Systems, 1992, 13 pages.

Mir, Irfan Faisal, "Reliability management techniques in SSD storage systems," University of Leicester, 2014; 2 pages.

Wei Yi et al., "A new differential RAID for high reliable All Flash Array," Department of Electronic Science and Engineering, National University of Defense Technology, 2014; 3 pages.

List of IBM Patents or Patent Applications Treated as Related; (Appendix P), Date Filed Jun. 7, 2016; 2 pages.

U.S. Appl. No. 15/175,065, filed Jun. 7, 2016; Entitled: Asymmetric Storage Data Distribution.

* cited by examiner

US 10,545,681 B2

ASYMMETRIC STORAGE DATA DISTRIBUTION

BACKGROUND

The invention relates generally to storing data, and more specifically, to asymmetric storage data distribution.

Storing ever increasing data volumes has been and continues to be a challenge in data centers. With the rise of the big data phenomenon and the requirement to store not only structured or semi-structured data but also unstructured data, data from sensors of any kind in a digital format, a proper management of storage system life-times becomes a pure necessity. This need is even more increased in days in which new storage technologies are introduced in data centers, but also in the private/personal sector. Some of these new storage technologies include solid state devices (SSD) of phase change memory systems (PCM), which may have a different time-dependent characteristic of storing data as compared to spinning magnetic disks. One effect that characterizes SSDs or PCM storage systems, and in some cases also dynamic RAM (random access memory) storage systems, is that these systems show an aging effect or a wear level. These effects undermine a long-term reliability of the storage systems, or in other words, these systems allow only a limited number of writes before they need to be replaced.

Existing RAID (redundant array of independent disks) controllers attempt to equally distribute data to all available storage systems for a maximum performance. When the storage system is an SSD and when such an SSD fails, the data on the failing device is reconstructed from the other members onto a hot-spare storage system. This works well for disks which fail without much warning.

However, SSDs and also PCM systems as well as others fail in different ways. The total number of writes is limited due to physical effects of the underlying storage elements. In case of a typical equal distribution of write excesses to the storage system, more or less all storage elements should fail typically at the same time. This may be seen as a real threat to storage systems. Hence, there is a need to ensure proper maintainability of aging storage systems in order to be compliant with RAS standards (reliability, availability, and serviceability) in high performance and highly reliable computing systems.

SUMMARY

According to an embodiment a method, system, and computer program product for asymmetric storage data distribution. A method includes operating an array of multiple persistent storage elements in a system that includes data stored in storage areas that are distributed across the storage elements. A first percentage of the storage areas are defined as hot storage areas and a second percentage of the storage areas are defined as spare storage areas such that remaining storage areas define a third percentage as cold storage areas. A hot group of hot storage areas, a spare group of spare storage areas and a cold group of cold storage areas are built. Each of the storage areas are assigned to either the hot group, the spare group or the cold group, respectively. A hot storage area and a cold storage area each include a first storage block on two different storage elements, and the hot storage area and the cold storage area each include a corresponding second storage block on a storage element different to the storage element on which the first respective storage block is stored. The storage blocks are distributed across the storage elements such that blocks of storage areas with the highest write rate of all storage areas are placed on a hottest storage element. At least one logical unit including a plurality of storage areas is defined and access is provided to the at least one logical unit to store data.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, in which:

FIG. 3, which includes

DETAILED DESCRIPTION

Figure 1:
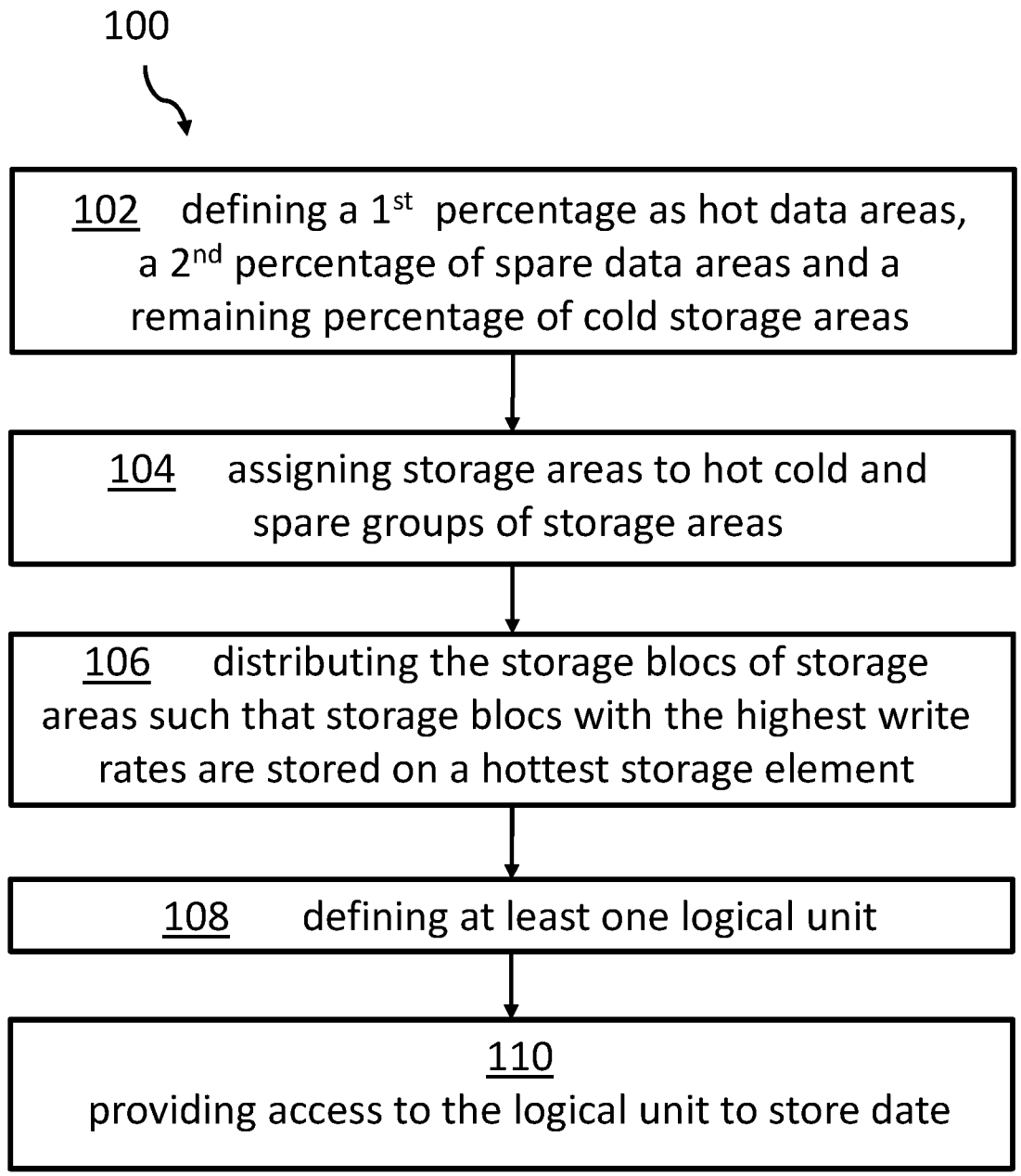
FIG. 1 shows a block diagram of a method for operating an array of multiple persistent storage elements in accordance with one or more embodiments.

Embodiments described herein include a method for operating an array of multiple persistent storage elements. Data may be stored in storage areas which may be distributed across the storage elements. The method may include defining a first percentage of the storage areas as hot storage areas and defining a second percentage of the storage areas as spare storage areas such that remaining storage areas define a third percentage of cold storage areas such that a hot group of hot storage areas, a spare group of spare storage areas and a cold group of cold storage areas may be built.

The method may also include assigning each of the storage areas to either the hot group, the spare group or the cold group, respectively. Thereby, a hot storage area and a cold storage area may each include a first storage block on two different storage elements and the hot storage area and the cold storage area may each include a corresponding second storage block on a storage element different to the storage element on which the first respective storage block may be stored.

Additionally, the method may include distributing the storage blocks across the storage elements such that blocks of storage areas with the highest write rate of all storage areas may be placed on a hottest storage element, defining at least one logical unit including a plurality of storage areas, and providing access to the at least one logical unit to store data.

According to other embodiments, an array of multiple persistent storage elements may be provided. Data may be stored in storage areas and the storage areas may be distributed across the storage elements. The array of multiple persistent storage elements may include a receiving unit adapted for receiving a defined first percentage of the storage areas as hot storage areas and a defined second percentage of the storage areas as spare storage areas such that remaining storage areas may define a third percentage of cold storage areas such that a hot group of hot storage areas, a spare group of spare storage areas and a cold group of cold storage areas may be built; and an assigning unit adapted for assigning each of the storage areas to either the hot group, the spare group or the cold group, respectively, wherein a hot storage area and a cold storage area may include each a first storage block, in which hot storage areas and cold storage areas may be stored on two different storage elements, and in which the hot storage area and the cold storage area may include each a corresponding second storage block on a storage element different to the storage element on which the first respective storage block may be stored.

In addition, the array of multiple persistent storage elements may include a distributing unit adapted for distributing the storage blocks across the storage elements such that blocks of storage areas with the highest write rate of all storage areas may be placed on a hottest storage element, at least one logical unit including a plurality of storage areas, and an access module adapted for accessing the at least one logical unit to store data.

In addition, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

Technical effects and benefits of embodiments for operating an array of multiple persistent storage elements may include that with the tracking of write accesses to storage elements it may be achieved that the wear level of storage systems may be used for a purposeful maintenance of a larger storage system including a precautionary replacement of those storage elements that may have reached or exceeded its life-time. Such a determination or decision may be based on predefined threshold values.

Technical effects and benefits of embodiments can also include ensuring that storage elements wear out asymmetrically such that a system maintenance component may be used to inform operators to replace storage elements, which may fail soon, before a storage element failure happens.

Embodiments can result in the reliability of a storage system comprising a plurality of storage elements being increased due to a decreased likelihood that more than one storage system will fail in the same time period. In times in which the value of enterprises may be related to the value of data they own and manage, this capability may represent a real technical but also an economical advantage.

Embodiments can also include a rebalancing of write amplifications in SSDs or other storage elements with a wear level behavior when writing to the storage elements. Embodiments described herein may be used for RAID systems of different levels. Embodiments may be implemented together with a storage technology known as GPFS (General Parallel File System), which is a high-performance clustered file system and which may be then be deployed in shared-disk or shared-nothing distributed parallel modes. Basically, the GPFS splits a disk or storage element into a plurality of stripes. Two stripes, each one on a different disk/storage element, may build a track. In a typical RAID implementation, two disks may build a conventional RAID group with mirrored data in tracks whose stripes are stored on two different disks. In a GPFS implementation, logical groups of stripes are built, which are distributed among several disks, defining logical disks. Also included on the physical disks and distributed among them are spare stripes. Such a system may allow a faster rebuild of data in a RAID system. When a disk fails, the data are rebuilt using all the operational disks in the de-clustered array, the bandwidth of which is greater than that of the fewer disks of a conventional RAID group. Because in GPFS stripes client data across all the storage node of a cluster, file system performance becomes less dependent upon the speed of any single rebuilding storage area. Embodiments can be similarly utilized by solid-state drives. It may be noted that the here used term "stripe" may be related to a storage block in the remaining part of this document.

According to an embodiment, the storage element may have a write dependent wear level. This may be the case with a solid state device, a phase change memory device, an optical storage drive, a holographic storage drive, a micro-mechanical storage drive, also dynamic random access memories, and the like.

According to an embodiment, the storage areas may be organized as a redundant array of independent disks/devices, e.g. as RAID 1. This would mean that the first block of the storage area and the second block of the same storage area may comprise identical content. However, embodiments may also work with any other RAID level. In general, embodiments may be implementable using the erasure code which may be seen as the mathematical generalization of RAID levels. The erasure code is known as a forward error correction (FEC) code for the binary erasure channel, which transforms a message of k symbols into a longer message (code word) with n symbols such that the original message can be recovered from a subset of the n symbols. The fraction $r=k/n$ is called the code rate, the fraction $k'/k$, where k' denotes the number of symbols required for recovery, is called reception efficiency.

According to an embodiment, the storage blocks may be all of equal size. This may, e.g., be the case with 64 kBit block NAND Flash memories. However, also other block sizes may be possible. If the storage blocks of the storage elements and/or the storage areas (the first and the second block) may be equal in size, the embodiment may be implementable more elegantly. However, also block of varying sizes may be possible.

According to another embodiment, a total number of, in particular physical, write accesses to each of the storage areas and/or to each of the storage elements may be tracked. Additionally, the total number of physical write accesses to a storage block of the storage area may be compared to a predefined threshold value. This may be utilized to determine the wear level of a storage block. If all storage blocks of a storage element may be supervised using the same or different threshold values, it may be determined when a storage element (e.g., an SSD) may reach its end of life-time. In this case, the storage device exceeding a predefined wear level may be exchanged by a new storage device in order to prevent a malfunction of the array of storage elements.

An additional embodiment may include, upon determining (e.g. on a regular basis) that the total number of write accesses to a storage element may exceed a predefined write threshold value, moving the blocks being stored on the storage element to blocks of the spare storage areas. This may free up that storage element which has had too many write accesses and which may have reached its expected end of life-time. If no stored in data are left on such a storage element, it may be removed and be replaced by a fresh storage element, e.g., a new SSD. With such a precautious action, the array of storage elements may continue its operation without any interruption.

According to an embodiment, a method may also comprise: upon a determination that a storage area which blocks are not located on the hottest storage element have a higher write rate than any of the blocks of storage areas located on the hottest storage element, moving one block of that storage area to the hottest storage element. In order to achieve this, the number of writes per time unit (i.e., the write rate) of the storage blocks of the most write-active storage element may be tracked in terms of the number of write accesses to each storage block. This way, a sequence of storage blocks may be determined which may sort the storage blocks of such a storage element according to the number of total write accesses from the start of the life-time of the storage element.

Thus, the storage block of the hottest storage element (i.e., that the storage element having the highest number of write accesses per time unit) having the lowest number of write accesses per time unit needs to be compared to write accesses of storage blocks of storage areas of the cold group. Using this algorithm, it may be achieved that those storage blocks of storage areas having the highest write access rate may be gathered on one storage element (e.g., the hottest storage element).

A further embodiment of a method may also comprise prior to moving the one block of that storage area having a higher write rate than any of the blocks of storage areas located on the hottest storage element to the hottest storage element, moving a block of a storage area having the lowest write access rate of blocks on the hottest storage element to one of the spare storage areas. This way it may be ensured that the data of the storage block to be moved may not be lost.

According to an additional embodiment, a method may also comprise marking the one block that has been moved to the hottest storage element as belonging to the spare group. This way, the predefined percentages of storage areas or storage blocks in the hot group, the cold group and the spare group remain the same if compared to a point in time before the movement of storage block across different storage elements. Due to the fact that spare storage blocks are not used for any write access during normal operation, those storage elements comprising spare storage blocks may have a slower aging process if compared to those storage elements being used to its full potential.

It may also be noted that according to one embodiment the first storage blocks of storage areas of the hottest storage element may be intermixed on a predefined basis such that all storage blocks wear-out almost equally within the same storage element. For this, the hottest storage block may exchange location within the hottest storage element with the least hot storage block on the hottest storage element; a similar exchange algorithm may be applied to the second hottest storage block with the second least hot storage block, and so on. This may ensure that the hottest storage element will not be worn-out in certain spots or individual storage cells but evenly.

In the context of this description, the following conventions, terms and/or expressions may be used:

The term "storage element" may denote a device adapted for storing data, in particular in a binary format. That may be a spinning magnetic disk, solid state device, a phase change memory system, a storing micro-mechanical system or an optical storage drive, a holographic storage drive or a dynamic random access memory or any other storage element showing aging or wearing-out effects.

The term "storage block" may denote a defined sub-part of a storage element. The sum of all storage blocks of a storage element may define the total capacity of a storage element. In some embodiments, the size or capacity (e.g., measured in bytes) of the storage blocks may be equal.

The term "storage area" may be defined by two or more storage blocks. The storage area may comprise a first and a second storage block. The second storage block of a storage area may be a copy of the first storage bloc. In operation, the two blocks of a storage area may store mirrored data. Thus, if a first storage block of a storage area may fail, the data may still be available on the second storage block of the storage area on a different storage element. This may also be denoted as a RAID 1 system of storage blocks. However, other RAID levels may also be possible.

In a typical RAID 1 storage system two storage elements (e.g., two disk drives) may comprise mirrored blocks of data such that the second disk drive may comprise a copy of all data blocks of the first storage element (e.g., the first disk drive). In a storage array with a plurality of storage elements, the blocks of the storage areas may be spread across all storage elements. This is known as a general parallel file system (GPFS).

The term "array of multiple persistent storage elements" may denote a plurality of storage elements being operated as a complete storage system. The array may comprise more than two storage elements, e.g., more than two SSDs. Such an array may comprise a storage controller controlling the operation of the complete array of multiple persistent storage elements. The internal operation of the array of multiple persistent storage elements may be transparent to a device driver of an operating system. The operating system may only access logical storage units which may be managed by the storage controller.

The term "hot storage areas" may denote a storage area and respectively also related storage blocks with a comparably high write access rate. Initially, at the start of a usage of the storage array, an administrator may define which storage blocks may be seen as hot (i.e., have a high write access rate). During the operation of the storage array, the method may decide itself which storage areas and storage blocks, respectively, may be treated as hot storage areas. The percentage of hot storage areas of all storage elements of the storage array may be chosen in a way that at least one storage system may comprise all first storage blocks from the hot storage group.

The term "cold storage areas" may denote storage areas and respectively also related storage blocks with a comparably low write access rate. The group of cold storage areas may be larger than the group of hot storage elements.

The term "spare storage areas" may denote storage areas and respectively also related storage blocks which may actually not be used during normal operation of the array of storage elements. It may be ensured that the number of spare storage blocks may be at least equal to the number of storage blocks on a hottest storage element such that in case of a failure of this hottest storage element all first storage blocks being stored on the hot storage element may be relocated to spare storage blocks of other storage elements. It may also be noted that second storage blocks of affected storage areas have no need to be relocated because they may be located on a different storage element. However, it may be ensured that a first storage block and a second storage block of the same storage area may not be located on the same storage element. Otherwise, the RAID characteristic of the storage area may be lost.

The term "write rate" may denote a number of write accesses per time unit, in particular to a storage block. Thus, for every time period of a predefined time amount the number of write accesses to a specific block may be counted. Dividing the number of write accesses by the time period may result in the write rate.

The term "hottest storage element" may denote one of the storage elements of the array of storage elements having storage blocks of storage areas with the highest write rate within the complete array of storage elements. The write rate of all storage blocks may be related to a temperature map in which storage blocks with higher write rates may represent a storage block with a higher temperature than a storage block with the lower write rate. It may be clear to a person skilled in the art that the here described temperature may be a virtual temperature representing the write rate.

The term "access" may denote reading or writing data to or from a storage block on a storage element. More particularly, the term "write access" may denote writing data to the storage block. In contrast, the term 'read access' may consequently denote reading data from the storage block. However, it may be required to differentiate between these two activities because only write accesses increase the wear level of a storage device and may consequently contribute to the aging of the storage device.

Thus, the term "write dependent wear level" may denote the characteristic of a storage device to have a limited life-time depending on the number of write accesses to the storage device. The storage devices discussed above typically have such a maximum life-time. Either, the storage device fails to accept additional write commands or the time required to write new data to the storage element at specific addresses may increase. Both behaviors may be unacceptable for highly reliable and high performance storage devices.

FIG. 1 shows a block diagram of an embodiment of the method 100 for operating an array of multiple persistent storage elements, e.g., SSDs. The data are stored in storage areas. Each storage area may comprise a first and a second block, in particular of equal size, one storing a digital mirror of the other storage block. An example of a typical size of the storage block may be 64 kB block which may be realized with NAND Flash memory devices. The storage areas are distributed across the storage elements such that no two blocks of the same storage area may be stored on the same storage element. An administrator may define, 102, a first percentage of the storage areas as hot storage areas and a second percentage of the storage areas as spare storage areas. The remaining storage areas may automatically define a third percentage of cold storage areas. This way, a hot group of hot storage areas, a spare group of spare storage areas and a cold group of cold storage areas is built. Typically, the group of cold storage areas may be significantly larger than the hot group of storage areas. However, it may make sense to define the percentages in such a way that the hot group of storage areas represents such a data amount that all first blocks of the storage areas of the hot group fit onto one storage element, i.e., the hottest storage element.

As a next step, each of the storage areas is assigned, 104, to either the hot group, the spare group or the cold group, respectively, wherein a hot storage area and a cold storage area each comprises a first storage block on two different storage elements. Thus, one storage element may comprise all hot storage areas, and all cool storage areas are stored on a plurality of other storage elements. On these other storage elements, also the spare storage blocks or storage areas are located.

In the special case of having more than two blocks for the storage area (e.g., 3 or more) the storage blocks of a storage area should all be stored on a different storage element. It may also be noted that each storage block may be identifiable by an identifier for the storage element or SSD plus an identifier for a logical blog address plus a block size (e.g., measured in bytes).

It may also be noted, that it may not be required to treat spare storage blocks as storage areas because the treatment of spare storage blocks may be handled not in pairs of blocks but individually.

On the other side, the hot storage area and the cold storage area each comprise, beside the first storage block of a storage area, a corresponding second storage block on a storage element different to the storage element on which the first respective storage block is stored.

The method comprises additionally distributing, 106, the storage blocks across the storage elements such that blocks of storage areas with the highest write rate of all storage areas are placed on a hottest storage element, defining, 108, at least one logical unit—in particular a plurality of logical units (LUNs), each comprising a plurality of storage areas (e.g., one storage block of a storage area) and providing, 110, access to the at least one logical unit or the plurality of LUNs to store and/or read data. The logical level of the LUNs is used by a device driver of an operating system. All other storage management tasks—as described above—may be performed by a storage controller.

Figure 2:
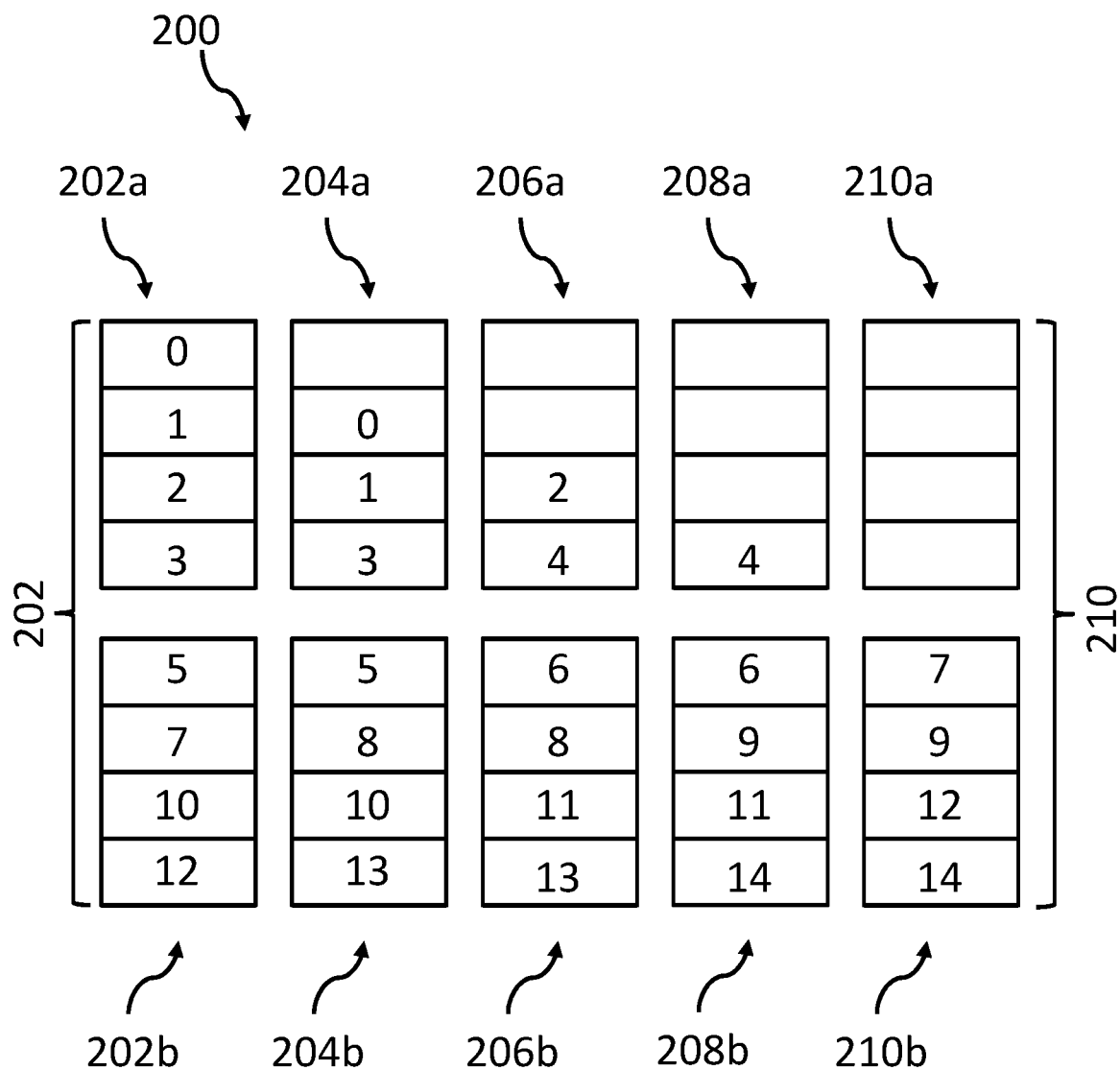
FIG. 2 shows a block diagram of a plurality of storage elements in accordance with one or more embodiments.

FIG. 2 shows a block diagram 200 of an array of multiple persistent storage elements. The figure shows five storage elements 202, 204, ..., 210. Each of these storage elements may be of the same or different size. Each of the five storage elements 202, 204, ..., 210 may be composed of physical sub storage elements; as an example, storage element 202 may comprise storage element 202a and 202b. More physical storage elements may be provided per complete storage element 204, ..., 210 with sub storage elements 204a, 204b, 206a, 206b, 208a, 208b, 210a and 210b.

The storage elements may be subdivided into storage blocks denoted with reference numerals 1 to 14. It may be noticed that each number appears twice. The squares in which the numbers are positioned may represent storage blocks. Thus, storage element 202 may comprise the eight storage blocks with the numbers 1, 2, 3, 5, 7, 10, 12. They may each represent the first storage block of the storage areas. For example, the second storage block of the storage area relating to storage block 0 of storage element 202 may be positioned in the second storage element 204, comprising partial storage elements 204a and 204b. The first storage block 0 and the second storage block 0 may together define the storage area 0.

Another example may be storage area 7. The first storage block of storage area 7 may be located in storage element 202, whereas the second storage block may be located in storage element 210. Hence, a skilled person may note that the storage areas and consequently the storage blocks relating to storage areas are distributed across the several storage elements. This may be performed using the GPFS algorithm or distribution method.

Additionally, storage blocks are shown having no numbers inside. The storage blocks may prove present spare storage blocks which may not being used in the current operating status of the storage array.

It may be assumed, that all first storage blocks of storage areas with the 8 highest write rates (in general, with the storage area fitting into a first storage element) may be located on the storage element 202 (i.e., the left most storage element). Subsequently, second storage blocks of the hot storage group as well as first and second storage blocks of the cold storage group may then be distributed over remaining storage elements 204, 206, 20b, 210 in a triangle like form (i.e., that an upper right triangle of spare storage blocks may be built as shown in FIG. 2. It may also be ensured that the storage blocks stored on one storage element 20b, 20b, 20b, 20b or 210b may be storable on a combination of spare storage blocks in the other storage elements 202b, 204b, 206b, 208b or 210b depending on the failing storage element 202, 204, 206, 208 or 210. As an example, if storage element 202 may fail, the storage blocks stored on storage element 202 may be relocated to the spare storage blocks on the other storage elements 204, 206, 208, 210. If against expectation, storage element 206 may fail, the storage blocks from storage element 206 may be relocated to storage element 204, 208, 210.

Figure 3A:
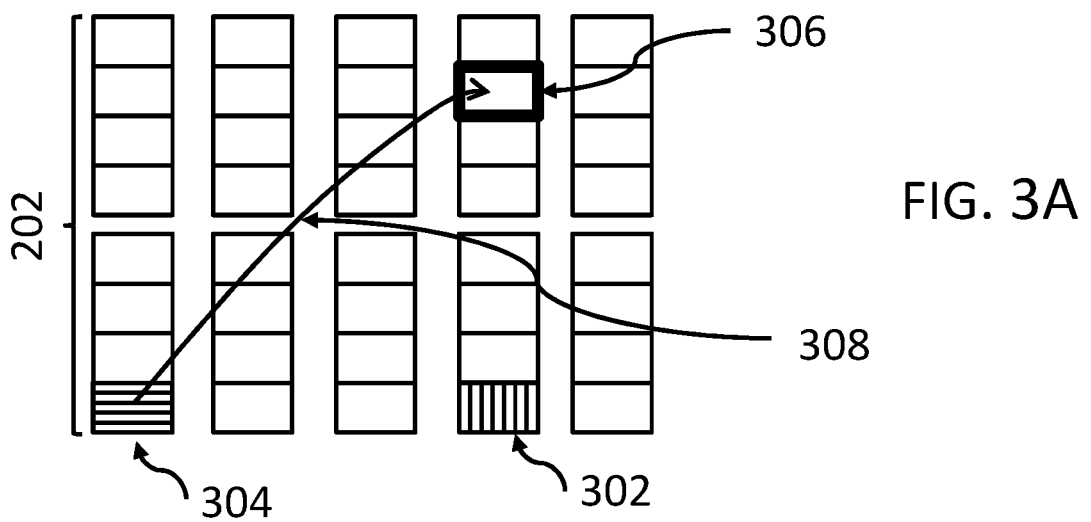
FIGS. 3A, 3B, and 3C, illustrates a process of rearranging storage blocks according to their write rate in accordance with one or more embodiments.
Figure 3B:
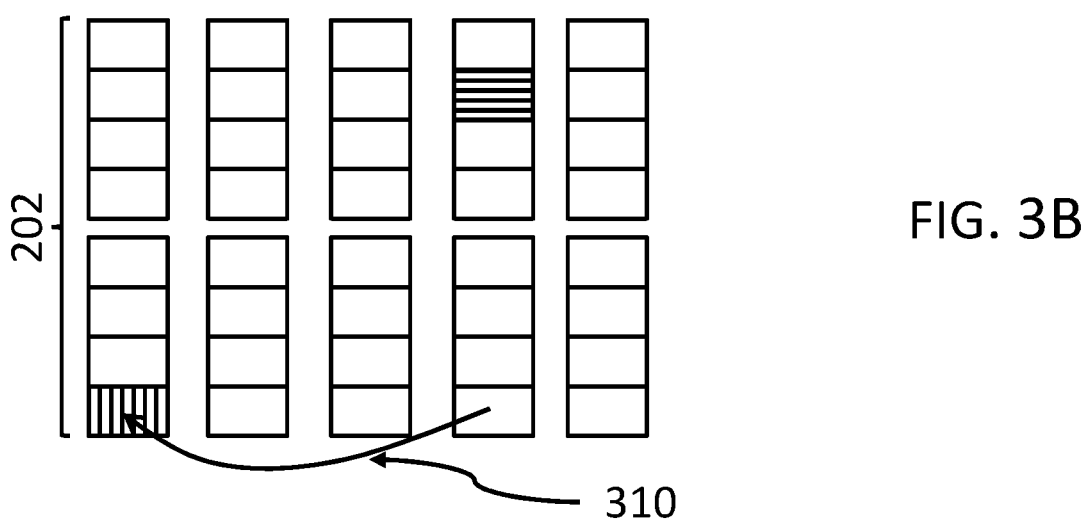
Figure 3C:
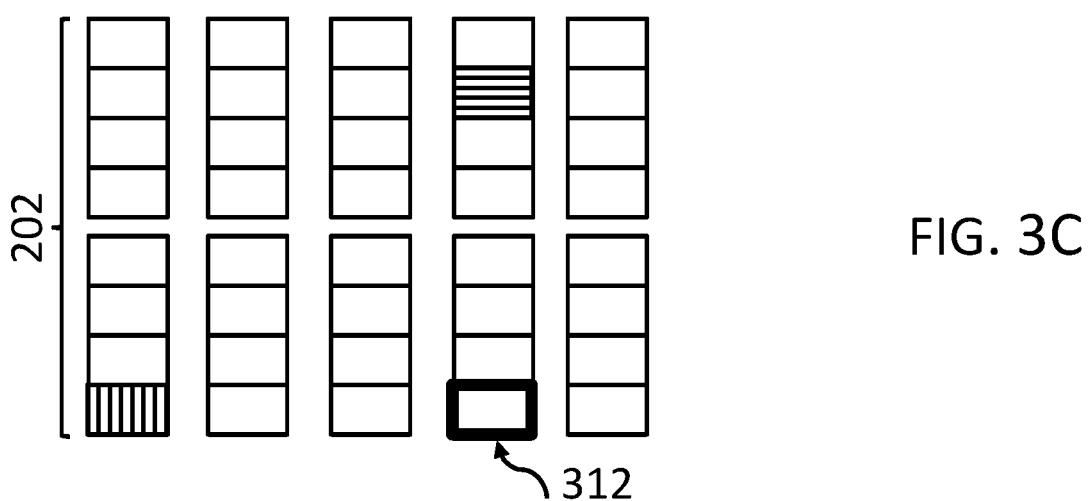

FIGS. 3A, 3B, and 3C show block diagrams of a process of reorganizing data blocks according to their write rate. In operation, the write rate of storage blocks of storage areas of the storage elements may be compared on a regular basis. It may turn out that storage block 302 may have a higher write rate than the storage block 304 of storage element 202. It may be assumed that storage block 304 may have the lowest write rate on storage element 202. In order to ensure that the hottest storage blocks of the storage array are located on storage element 202, storage block 302, or more precisely the content of storage block 302, may be moved to the place of storage block 304. In order to do so, the content of storage block 304 needs to be moved to a spare storage block 306. A comparison with FIG. 2 reveals that the respective storage block 306 of FIG. 2 is shown as a spare storage block because no number is inside.

The relocation of the content of storage block 304 to the original spare storage block 306 may be indicated by the arrow 308. In the next step, compare FIG. 3B, the content of storage block 302 may be moved to the now empty storage block on the storage element 202. This is indicated by the arrow 310. At the end of this process storage element 202 comprises again all first storage blocks of storage areas with the highest write rate.

Finally, storage block 312, compare FIG. 3C, is marked as new spare storage block. As a consequence, the number of hot storage areas, cold storage areas and spare storage areas is the same if compared to the status before the relocation of storage blocks started. Hence, also the ratio of percentages of hot storage areas, cold storage areas and spare storage areas of respective storage blocks remains constant. As a further consequence, storage element 202 may be worn out first in the sense of a write dependent wear level.

Figure 4:
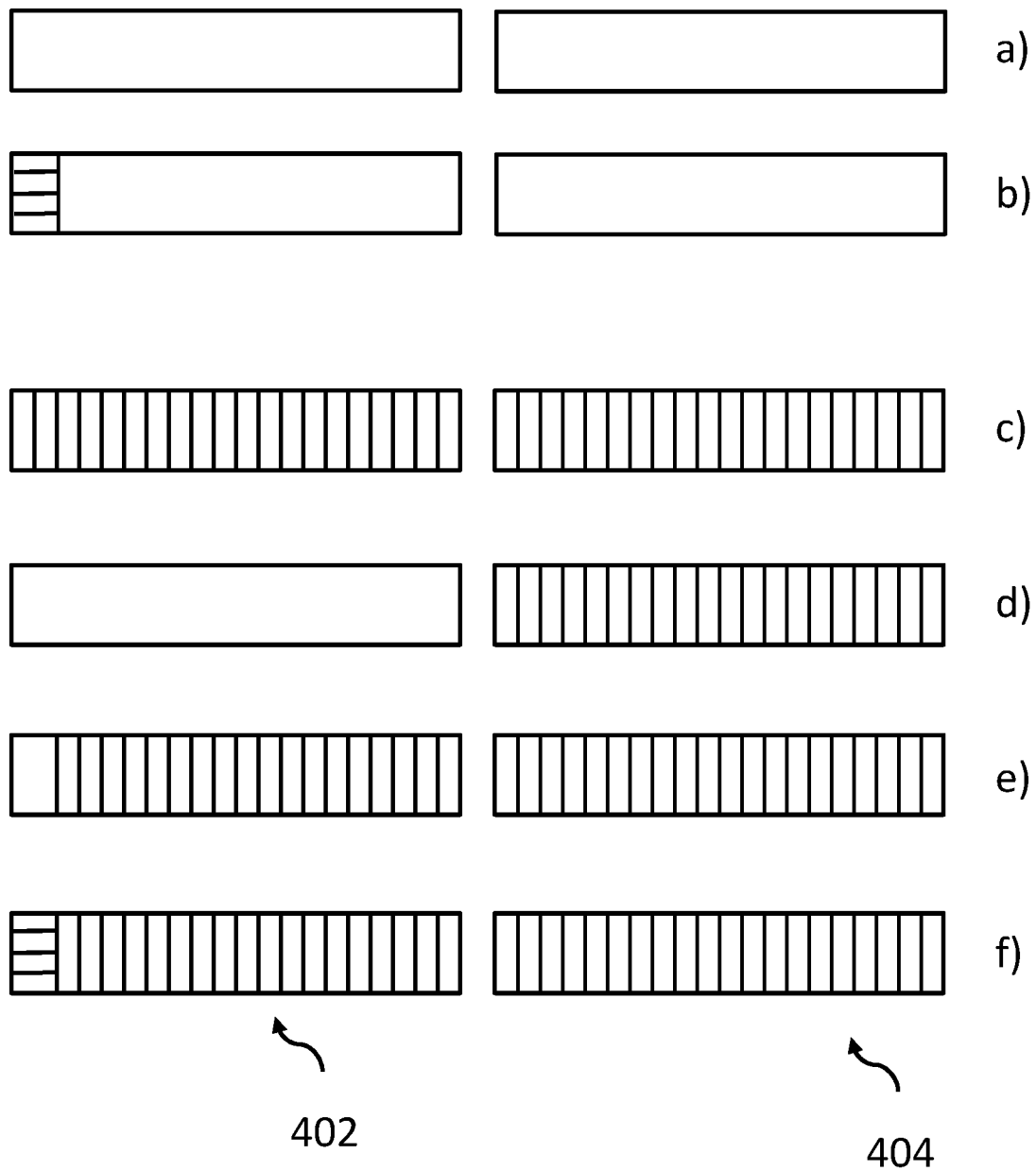
FIG. 4 shows a block diagram illustrating the effect of write amplification in accordance with one or more embodiments.

FIG. 4 shows a block diagram 400 of storage blocks 402, 404 at six different points in time indicated by a), b), c), d), e), and f). The diagram may illustrate the effect of write amplifications. It may be assumed that the storage blocks 402 to 404 (each being 64 kB in size) belong to an SSD which in size may only erase 64 kB (kilobyte) blocks, e.g. using NAND Flash memories. At time point a) it may be assumed that the storage blocks 402 and 404 are empty. If, e.g., 512 bytes should be written to storage block 402 a total of 512 bytes need to be written as indicated by the horizontally striped block in storage element 402 at point in time b).

If the storage blocks 402, 404 may be occupied (i.e., data may be stored into the blocks) and 512 bytes should be written to storage block 402, firstly the content storage block 402 may be raised (and stored and immediately), compare point in time d). Next, 64 kB minus 512 bytes have to be rewritten to storage block 402 at point in time e). It may be noted that there may still be space for 512 bytes on the left side of storage block 402. In a final step—point in time f)—the remaining 512 new bytes are stored in storage block 402. As a consequence 64 kB have been rewritten to the storage block 402. This may represent a write amplification of 1:128. This effect may lead to a fast wear-out of storage elements with the write dependent wear level. It may be noted that write amplification occurs when most blocks of an SSD may contain data. In some cases, a storage block may be denoted as sector of a storage element. Hence, the proposed method steers write amplification to SSDs that should fail first and at the same time other SSDs may be saved from hitting severe write amplification which may extend the life-time even further.

Generally, it may be distinguished between two cases of embodiments for the proposed method. In the first group of embodiments, always complete storage elements may be defined as comprising the storage blocks having the highest write rate. Consequently, other storage elements of the storage area are defined as cold storage devices. Here, on the cold storage elements, also the spare storage blocks may be located.

In a second group of embodiments, an active relocation of storage blocks of the hottest storage element may be performed if the underlying storage element may have reached its end of life-time. It may be assumed that also spare storage blocks may be present at such an end-of-life-time storage element.

If a storage element fails, all LUN maps, providing information about a mapping of logical storage areas and physical storage blocks, are searched whether they are affected by the failing storage element. For each storage area of such a failing storage element, in particular for the respective storage block, a new unused, spare storage block is picked from the hot or cold group of storage areas. If all of these are already completely used, a new unused spare storage block is selected. The storage controller may also search for an area on a different storage element than the other storage block belonging to the storage area which is stored on a storage element which is still in operation. The related data are then copied from the intact storage block of the related storage area to the newly selected storage block of the respective storage area and the LUN is updated to refer to the new storage area.

Figure 5:
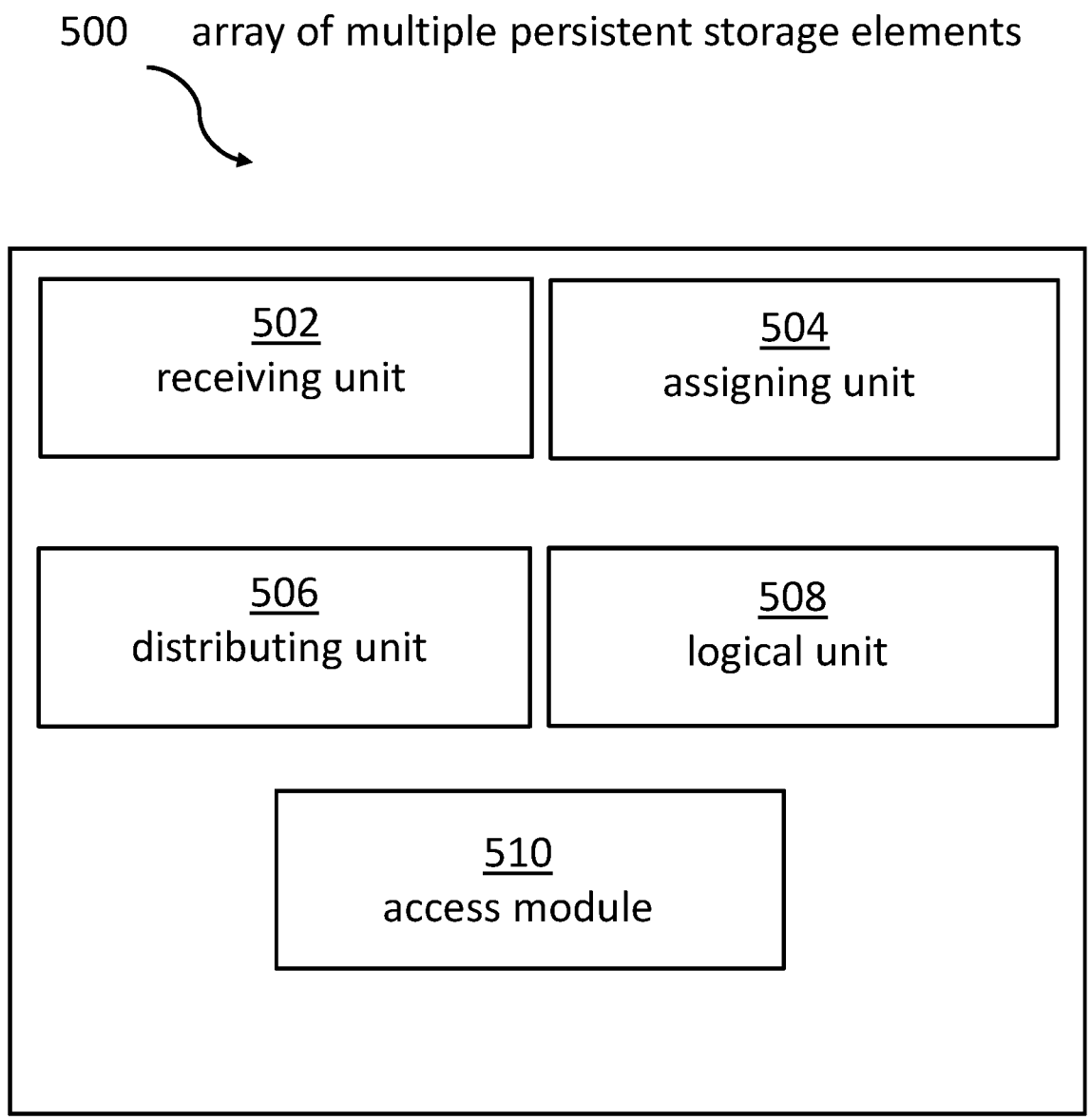
FIG. 5 shows an array of multiple persistent storage elements in accordance with one or more embodiments.

FIG. 5 shows an embodiment of the array 500 of multiple persistent storage elements comprising additional controlling units. As discussed above, data are stored in storage areas and storage areas are distributed across the storage elements. FIG. 5 shows that the array of multiple persistent storage elements comprises a receiving unit 502 adapted for receiving a defined first percentage of the storage areas as hot storage areas and a defined second percentage of the storage areas as spare storage areas such that remaining storage areas define a third percentage of cold storage areas such that a hot group of hot storage areas, a spare group of spare storage areas and a cold group of cold storage areas are built.

The array of multiple persistent storage elements comprises as well an assigning unit 504 adapted for assigning each of the storage areas to either the hot group, the spare group or the cold group, respectively, wherein a hot storage area and a cold storage area each comprise a first storage block, wherein hot storage areas and cold storage areas are stored on two different storage elements, and wherein the hot storage area and the cold storage area each comprise a corresponding second storage block on a storage element different to the storage element on which the first respective storage block is stored. Furthermore, the array of multiple persistent storage elements 500 comprises a distributing unit 506 adapted for distributing the storage blocks across the storage elements such that blocks of storage areas with a highest write rate of all storage areas are placed on a hottest storage element, as well as a controller 508 for controlling at least one logical unit comprising a plurality of storage areas, and an access module 510 adapted for accessing the at least one logical unit to store data.

Figure 6:
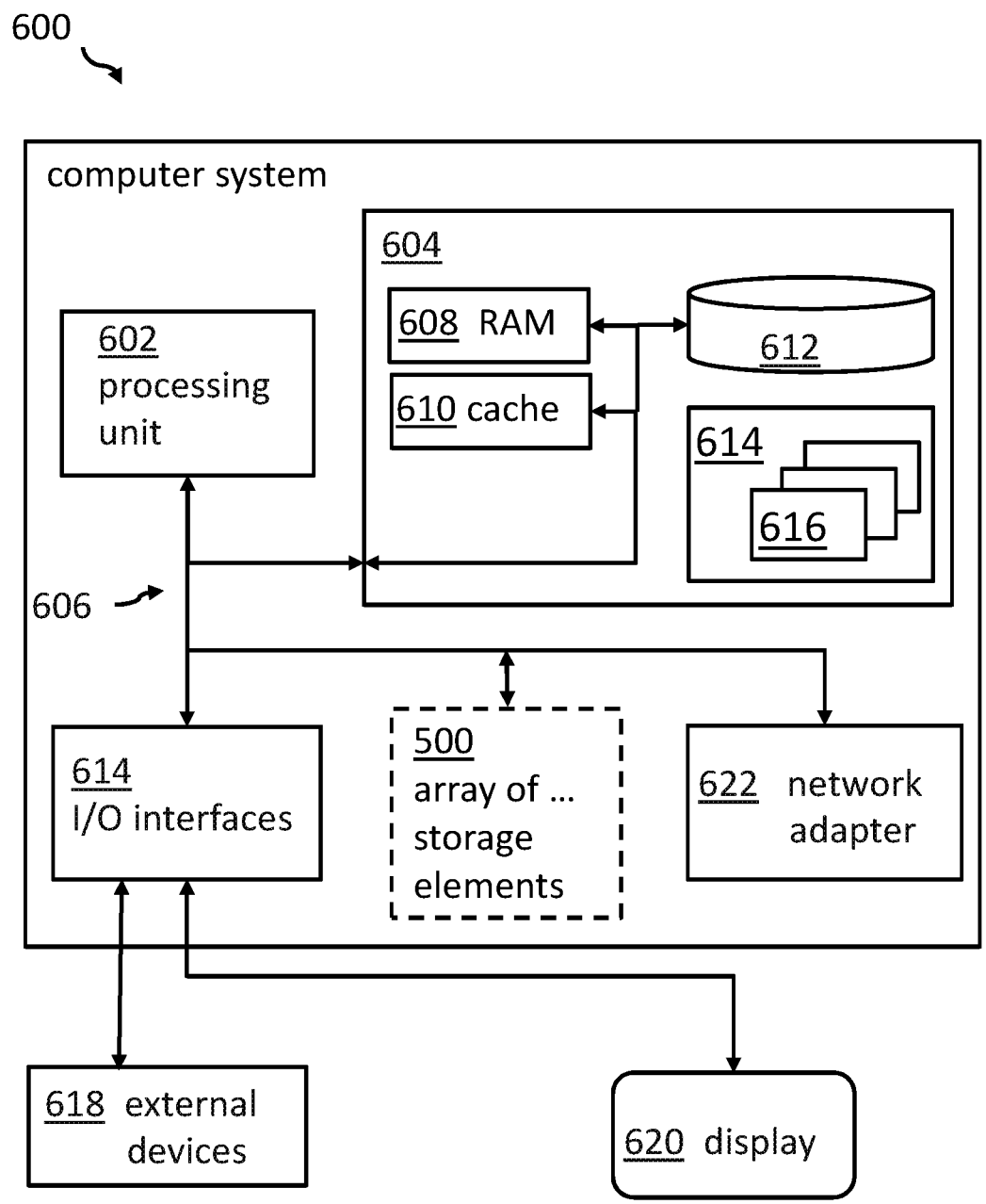
FIG. 6 shows a computing system comprising the array of multiple persistent storage elements in accordance with one or more embodiments.

Embodiments of the invention may be implemented together with virtually any type of computer, regardless of the platform being suitable for storing and/or executing program code. This may also apply to the array of multiple persistent storage elements as well as to a related controller. FIG. 6 shows, as an example, a computing system 600 suitable for executing program code related to the proposed method or for connecting to the array of multiple persistent storage elements.

The computing system 600 is only one example of a suitable computer system and is not intended to suggest any limitation as to the scope of use or functionality of embodiments of the invention described herein. Regardless, computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couples various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

Program/utility 614, having a set (at least one) of program modules 616, may be stored in memory 604 by way of example, and not limitation, as well as an operating system, one or more application programs, other program modules, and program data. Each of the operating system, one or more application programs, other program modules, and program data or some combination thereof, may include an implementation of a networking environment. Program modules 616 generally carry out the functions and/or methodologies of embodiments of the invention as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of computer system/server 600 via bus 606. It should be understood that although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, array of multiple persistent storage elements 500 may be attached to the bus system 606.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system that includes:
an array of multiple persistent storage devices that includes a General Parallel File System (GPFS) and includes storage areas for storing data, the storage areas distributed across all of the multiple persistent storage devices of the array, each of the storage devices having a plurality of storage stripes, wherein each of the plurality of storage stripes comprises a storage block and wherein each stripe inhabits each device of the array;
a memory having computer readable instructions; and
a processor for executing the computer readable instructions, the computer readable instructions including:
receiving, from a system administrator of the system, a first percentage of said storage areas to be defined as hot storage areas and a second percentage of said storage areas to be defined as spare storage areas;
defining the remaining storage areas of said storage areas as cold storage areas such that a hot group of hot storage areas, a spare group of spare storage areas and a cold group of cold storage areas are built, wherein the spare storage area is not used during normal operation of the array of multiple persistent storage devices;
assigning each of said storage areas to either said hot group, said spare group or said cold group, respectively, wherein a hot storage area and a cold storage area each comprise a first storage stripe on a first plurality of storage devices, and wherein said hot storage area and said cold storage area each comprise a corresponding second storage stripe on a second plurality of storage devices different to said first plurality of storage devices on which said first respective storage stripe is stored;
distributing a plurality of storage stripes across all of the storage devices of the array such that stripes of storage areas with the highest write rate of all storage areas are placed on a hottest storage device;
defining at least one logical unit comprising a plurality of storage areas;
providing access to said at least one logical unit to store data;
tracking a total number of write accesses to at least one of each of said storage areas and each of said storage devices during operation of the array of multiple persistent storage devices; and
rebalancing write amplifications within the array of multiple persistent storage devices based on the tracked total number of write accesses, in response to writing to at least one of said storage devices during operation of the array of multiple persistent storage devices, wherein the rebalanced write amplifications are steered to at least one storage device of the array of multiple persistent storage devices determined to fail before other storage devices of the array of multiple persistent storage devices based on the tracked total number of write accesses.

2. The system according to claim 1, wherein each storage device in the array of multiple persistent storage devices has a write dependent wear level.

3. The system according to claim 1, wherein said storage areas are organized as a redundant array of independent disks.

4. The system according to claim 1, wherein said storage stripes are all of equal size.

5. The system according to claim 1, wherein the computer readable instructions further comprise:
upon determining that said total number of write accesses to a storage device exceeds a predefined threshold value, moving said stripes being stored on said storage device to stripes of said spare storage areas.

6. The system according to claim 1, wherein the computer readable instructions further comprise:
prior to moving said one stripe of that storage area having a higher write rate than any of said stripes of storage areas located on said hottest storage device to said hottest storage device, moving a stripe of a storage area having a lowest write access rate of stripes on said hottest storage device to one of said spare storage areas.

7. The system according to claim 1, wherein the computer readable instructions further comprise:
marking said one stripe that has been moved to said hottest storage device as belonging to said spare group.

8. A computer program product for operating an array of multiple persistent storage devices that includes a General Parallel File System (GPFS) and includes data stored in storage areas that are distributed across all of the storage devices of the array, each of the storage devices having a plurality of storage stripes, wherein each of the plurality of storage stripes comprises a storage block and wherein each stripe inhabits each device of the array, the computer program product comprising a computer readable storage medium having program instructions embodied therewith, the program instructions executable by a processor located on a mobile device to cause the computer processor to perform:
receiving, from a system administrator of the system, a first percentage of said storage areas to be defined as hot storage areas and a second percentage of said storage areas to be defined as spare storage areas;
defining the remaining storage areas of said storage areas as cold storage areas such that a hot group of hot storage areas, a spare group of spare storage areas and a cold group of cold storage areas are built, wherein the spare storage area is not used during normal operation of the array of multiple persistent storage devices;
assigning each of said storage areas to either said hot group, said spare group or said cold group, respectively, wherein a hot storage area and a cold storage area each comprise a first storage stripe on a first plurality of different storage devices, and wherein said hot storage area and said cold storage area each comprise a corresponding second storage stripe on a second plurality of storage devices different to said first plurality of storage elements on which said first respective storage stripe is stored;
distributing a plurality of storage stripes across all of the storage devices of the array such that stripes of storage areas with the highest write rate of all storage areas are placed on a hottest storage device;

defining at least one logical unit comprising a plurality of storage areas;

providing access to said at least one logical unit to store data, tracking a total number of write accesses to at least one of each of said storage areas and each of said storage devices during operation of the array of multiple persistent storage devices; and rebalancing write amplifications within the array of multiple persistent storage devices based on the tracked total number of write accesses, in response to writing to at least one of said storage devices during operation of the array of multiple persistent storage devices, wherein the rebalanced write amplifications are steered to at least one storage device of the array of multiple persistent storage devices determined to fail before other storage devices of the array of multiple persistent storage devices based on the tracked total number of write accesses.

9. The computer program product of claim 8, wherein said storage areas are organized as a redundant array of independent disks.

10. The computer program product of claim 8, wherein said storage blocks are all of equal size.

11. The system according to claim 1, wherein a number of blocks in the spare storage area is at least equal to a number of storage stripes on a hottest storage device.

12. The computer program product of claim 8, wherein a number of stripes in the spare storage area is at least equal to a number of storage stripes on a hottest storage device.

13. The system according to claim 1, wherein write amplifications are steered to at least one storage device of the array of multiple persistent storage devices determined to fail before other storage devices of the array of multiple persistent storage devices.

14. The computer program product of claim 8, wherein write amplifications are steered to at least one storage device of the array of multiple persistent storage devices determined to fail before other storage devices of the array of multiple persistent storage devices.

15. The system according to claim 1, wherein write amplifications occur when a majority of storage stripes of a persistent storage device contain data.

16. The computer program product of claim 8, wherein write amplifications occur when a majority of storage stripes of a persistent storage device contain data.

17. The system according to claim 1, further comprising replacing storage devices that have reached or exceeded an associated life-time based on the tracked total number of write accesses.

18. The system according to claim 1, further comprising providing a notification to replace storage device determined to fail before an actual failure of the storage device occurs.

19. The computer program product of claim 8, further comprising replacing storage devices that have reached or exceeded an associated life-time based on the tracked total number of write accesses.

20. The computer program product of claim 8, further comprising providing a notification to replace storage device determined to fail before an actual failure of the storage device occurs.

* * * * *